(12) United States Patent
Speelman et al.

(10) Patent No.: US 6,921,105 B2
(45) Date of Patent: Jul. 26, 2005

(54) INTEGRALLY MOLDED PASSENGER AIRBAG COVER

(75) Inventors: Phillip B. Speelman, Dayton, OH (US); Mark B. Wolfe, Vandalia, OH (US); Mark W. Craycraft, Springboro, OH (US); Joseph P. Wetzel, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 70 days.

(21) Appl. No.: 10/378,999

(22) Filed: Mar. 4, 2003

(65) Prior Publication Data

US 2004/0174000 A1 Sep. 9, 2004

(51) Int. Cl.⁷ ............................................. B60R 21/20
(52) U.S. Cl. .................................... 280/728.3; 280/731
(58) Field of Search ........................... 280/728.2, 728.3, 280/731, 732

(56) References Cited

U.S. PATENT DOCUMENTS

| | | | | |
|---|---|---|---|---|
| 5,064,217 A | * | 11/1991 | Shiraki | 280/728.3 |
| 5,082,310 A | | 1/1992 | Bauer | 280/732 |
| 5,393,088 A | | 2/1995 | Bauer et al. | 280/728 A |
| 5,522,616 A | | 6/1996 | Bauer et al. | 280/728.2 |
| 5,590,903 A | * | 1/1997 | Phillion et al. | 280/728.3 |
| 5,698,283 A | * | 12/1997 | Yamasaki et al. | 428/43 |
| 5,797,619 A | | 8/1998 | Bauer et al. | 280/728.3 |
| 5,997,030 A | * | 12/1999 | Hannert et al. | 280/728.3 |
| 6,045,153 A | | 4/2000 | Sommer et al. | 280/728.3 |
| 6,050,594 A | | 4/2000 | Budnick | 280/728.3 |
| 6,168,189 B1 | * | 1/2001 | Dennis | 280/728.3 |
| 6,247,722 B1 | | 6/2001 | Brodi, Jr. et al. | |
| 6,348,172 B1 | | 2/2002 | Barnes | 264/309 |
| 6,382,660 B1 | | 5/2002 | Starner et al. | |
| 6,422,589 B1 | | 7/2002 | Ostermann et al. | |
| 6,453,535 B1 | * | 9/2002 | Nicholas | 29/413 |
| 6,467,801 B1 | * | 10/2002 | Preisler et al. | 280/728.3 |
| 6,485,050 B1 | | 11/2002 | Simon et al. | |
| 6,502,852 B2 | | 1/2003 | Kassman et al. | |
| 6,533,314 B2 | | 3/2003 | Merrifield et al. | |
| 6,733,032 B2 | * | 5/2004 | Pinsenschaum et al. | 280/728.3 |

FOREIGN PATENT DOCUMENTS

| | | |
|---|---|---|
| EP | 1 216 894 A1 | 6/2002 |
| WO | WO 01/74629 A1 | 10/2001 |

* cited by examiner

*Primary Examiner*—David R. Dunn
(74) *Attorney, Agent, or Firm*—Scott A. McBain (57) ABSTRACT

An instrument panel cover arrangement used for covering an airbag module mounted beneath an instrument panel cover in a vehicle and method of making the same is disclosed. The arrangement includes a rigid substrate forming the instrument panel cover and having inner and outer surfaces and a hidden door configured in the substrate aligned with the underlying airbag module. The hidden door is removably securely to the substrate so as to be flushly aligned with the outer surface of the substrate and is defined by a thinned portion relative to the substrate outlining a perimeter of the hidden door. The thinned portion defines a first relief in the inner surface of the substrate. A plurality of cut lines generally define an airbag deployment opening and extend entirely through the substrate at a location corresponding to the first relief. A chute wall portion extends from the inner surface of the substrate outside of the perimeter defining the hidden door, wherein the chute wall portion, hidden door, and substrate are integrally molded.

37 Claims, 5 Drawing Sheets

INTEGRALLY MOLDED PASSENGER AIRBAG COVER

TECHNICAL FIELD

This disclosure relates to an instrument panel cover arrangement including an airbag deployment opening and a method of making such an instrument panel cover arrangement.

BACKGROUND

As more and more vehicles are equipped with supplemental inflatable restraint (SIR) systems, other vehicle components have been modified to accommodate the use of such systems. For example, most SIR systems are disposed within and behind an instrument panel which extends across the width of a vehicle compartment. Generally, a vehicle instrument panel comprises a plurality of layers including a panel cover, a foam layer, and a substrate. The cover is typically disposed adjacent the foam layer which is disposed, correspondingly, adjacent to the substrate, thus forming the panel.

Traditionally, an instrument panel employed in a vehicle equipped with a SIR system utilizes a discrete door which covers an opening formed in the instrument panel for the airbag cushion to deploy through upon actuation of the SIR system. This separate door is designed to open in response to the force of the expanding airbag cushion. As the pressure in the airbag cushion increases, a force is generated on the door. The door then selectively separates from the remaining portion of the instrument panel to permit the airbag cushion to deploy.

Typically, the manufacture of a conventional instrument panel involves two separate processes and a final assembly step. First the instrument panel is formed in view of the shape and size of the door with an opening adjacent to the SIR system. Meanwhile, in a separate process the door is formed using techniques known in the art. Finally, the airbag door is assembled onto the instrument panel for use in conjunction with the SIR system. The plurality of steps involved in the manufacture of the conventional instrument panel consume substantial time and resources and result in an aesthetically apparent airbag door.

Recent advances in the art teach a vehicle instrument panel that utilizes a hidden deployment region integrally formed within an inner surface of the instrument panel to provide a panel of less weight and without the obvious markings of an airbag door. The deployment region of such panels comprises a plurality of scores or cuts formed in the inner surface of the instrument panel. The scores represent weakened portions of the instrument panel designed so that the force of an inflating airbag cushion causes the instrument panel to separate along the scores to thereby provide an opening for the inflating airbag cushion to deploy therethrough and be directed into the passenger compartment of a vehicle.

The manufacture of vehicle instrument panels with integrally formed hidden airbag doors typically involves three distinct processes. First, the various layers of the panel are cast using methods common in the art. Then, a blade is brought into contact with the various cast layers of the panel to melt and/or cut into the interior surface of the layers forming the scores and cuts necessary to allow deployment of the concealed airbag. Finally, the layers are adhered together in such a way as to construct the panel.

To date, hidden airbags have been provided for vehicle OEMs in several different design and manufacturing configurations. However, none of them have combined a hidden passenger airbag (PAB) door having a chute wall molded as one piece into the instrument panel (I/P) substrate, thus reducing overall part costs, mass and dimensional variation. These goals have driven the need to develop a tear seam that would allow the airbag to deploy correctly while maintaining structural rigidity for occupant abuse. The airbag door must cover and prevent occupant access to the airbag and its inflator until a deployment event. During the deployment event, the door must open and clear itself from the path of the inflating airbag. This dual purpose requires the perimeter of the airbag door to be relieved in some manner to prevent access, yet allow proper deployment of the airbag.

The relief is typically created by removing the majority of the molded plastic I/P substrate defining the tear seam of the door. At predetermined locations, a small amount of material is left as molded to hold the door in place until deployment. These uncut sections are called "nubbins". The nubbins are required to provide the structural rigidity needed to prevent a occupant from incidently opening the hidden airbag door. However, the nubbins break in an unpredictable direction and shape during a PAB deployment event and risk snagging and/or tearing the airbag.

Accordingly, it is desired to mold an integral PAB door and chute wall that effectively eliminates the negative effects of previous nubbin designs while still maintaining the ability to prevent the occupant abuse type of PAB door opening without having to add component parts to the design.

SUMMARY

According to the present invention, an instrument panel cover arrangement for use in an instrument panel of a vehicle compartment having a supplemental inflatable restraint (SIR) system and a method for manufacturing the instrument panel substrate are provided. The arrangement includes a rigid substrate forming the instrument panel and having top and bottom surfaces and a hidden door configured in the substrate aligned with the underlying airbag module. The hidden door is removably secured to the substrate so as to be flushly aligned with the top surface of the substrate and is defined by a thinned portion relative to the substrate outlining a perimeter of the hidden door. The thinned portion defines a first relief in the bottom surface of the substrate. A plurality of cut lines generally define an airbag deployment opening and extend entirely through the substrate at locations corresponding to the first relief. A chute wall portion extends from the bottom surface of the substrate outside of the perimeter defining the hidden door, wherein the chute wall portion, hidden door, and substrate are integrally molded. A second relief is configured in the top surface of the substrate outside of the airbag deployment opening aligned with each nubbin defining opposite sides of the hidden door. The second relief is configured to allow a corresponding nubbin to break cleanly and limit engagement with the airbag during a deployment event.

The above-described and other features are appreciated and understood by those skilled in the art from the following detailed description, drawings, and appended claims.

DETAILED DESCRIPTION

Figure 1:
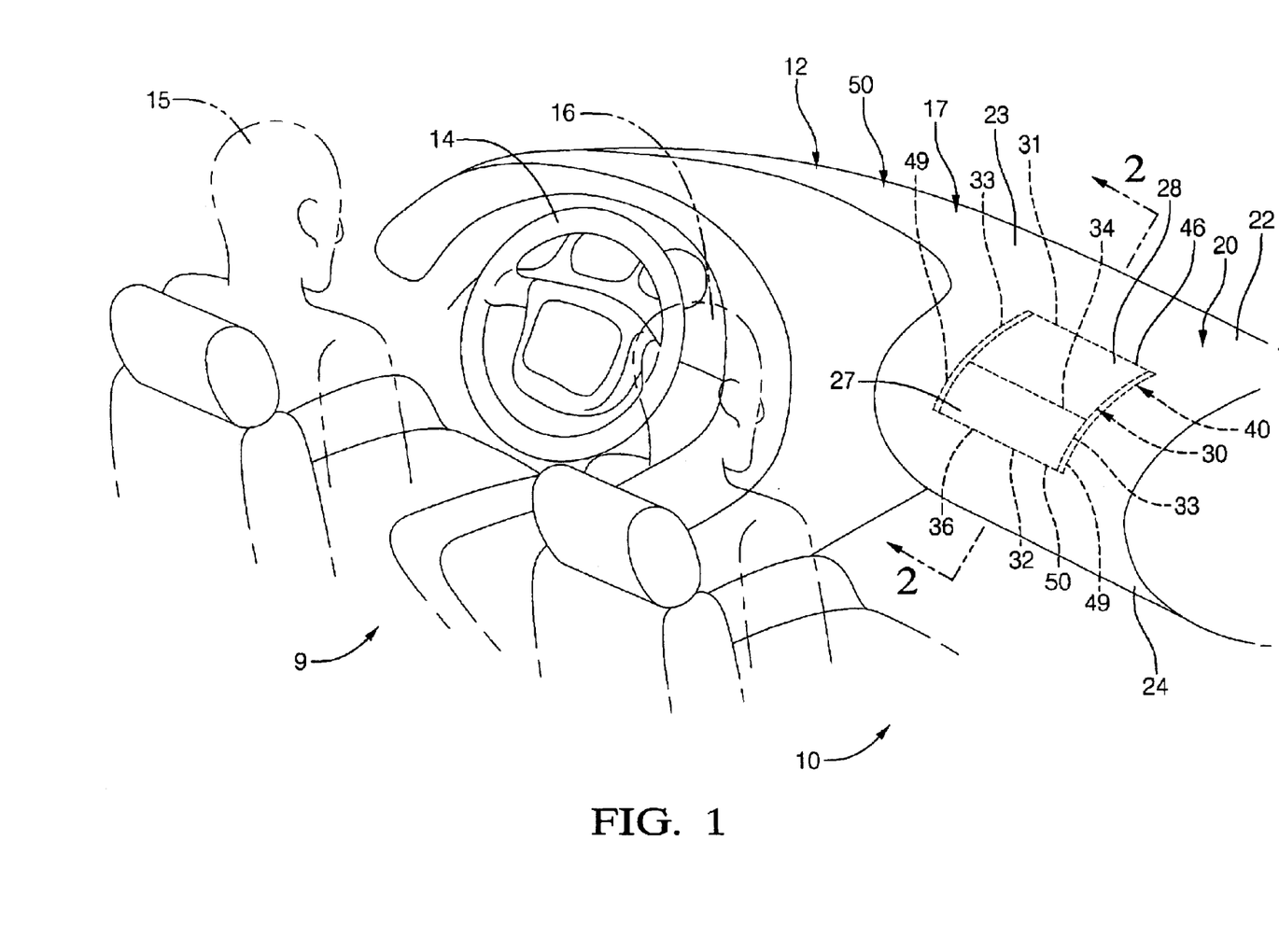
FIG. 1 is a perspective view of an exemplary vehicle instrument panel in accordance with the present disclosure.

Referring to FIG. 1, a vehicle 9 includes a vehicle interior 10 including an instrument panel 12 extending transversely across the vehicle interior 10 between the sides of the vehicle 9. The left side of the instrument panel 12 includes an instrument cluster and steering wheel 14 located in front of a vehicle driver 15. The right side of the instrument panel 12 is positioned forward of a vehicle passenger 16.

The instrument panel 12 includes an instrument panel cover arrangement, generally designated as 20. The instrument panel cover arrangement 20 extends transversely across and conceals the underlying components of the instrument panel 12, such as HVAC ducts and an airbag module 60. Advantageously, the instrument panel cover arrangement 20 is preferably formed as a single continuous structure, which provides a generally smooth and aesthetically pleasing surface including integrally formed curvatures. Both an upper portion 22 and a lower portion 24 of the instrument panel cover arrangement 20 are preferably integrally formed as a single continuous structure.

Figure 2:
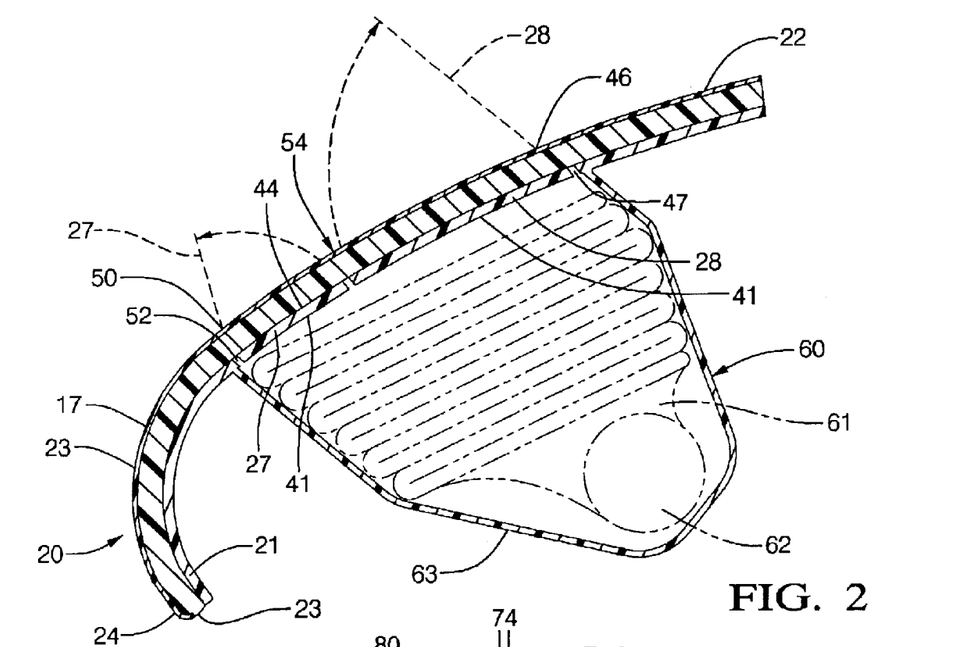
FIG. 2 is a cross-sectional view taken along line 2—2 of FIG. 1 and schematically shows the opening of a pair of hidden doors with phantom lines.

As best shown in FIG. 2, the instrument panel cover arrangement 20 includes an instrument panel substrate 21 which preferably is formed of a lightweight, rigid material, such as PC+ABS. The instrument panel substrate 21 is preferably integrally molded as a single component. It will be appreciated that although the instrument panel substrate 21 is preferably PC+ABS, it could be any lightweight, rigid material. Advantageously, a material such as PC+ABS, can provide a thin and lightweight instrument panel substrate 21 which can be formed into many shapes and provides a substrate surface to mount a foam layer 23 thereon. Unfortunately, this lightweight, rigid substrate 21 is difficult to cut and is difficult to break open during airbag deployment due to its strength. Thus, the substrate 21 must be cut entirely therethrough prior to airbag deployment to enable the formation of a deployment opening 30, as will be described in detail.

As best shown in FIGS. 1 and 2, the substrate 21 is provided with forward, rearward, dividing and side cut lines 31, 32, 33, 34 which divide the substrate 21 into a minor substrate door portion 27 and a major substrate door portion 28 to form a hidden door opening 30 for deployment of an airbag therethrough. The minor substrate door portion 27 generally overlies the airbag module 60 and pivots open about pivot 36 upon airbag deployment as enabled by the cut lines 32, 33, 34 described further hereinafter. The minor substrate door portion 27 is preferably entirely separated from the major substrate door portion 28 by the rearward, dividing, and side cut lines 32, 34, 33 respectively. Likewise, major substrate door portion 28 generally overlies the airbag module 60 and pivots open about pivot 37 upon airbag deployment as enabled by the cut lines 31, 33, 34 described further hereinafter. The major substrate portion 28 is preferably entirely separated from the minor substrate door portion 27 by the forward, dividing, and side cut lines 31, 34, 33 respectively.

Still referring to FIGS. 1 and 2, the forward edge of the major door portion 28 serves as a hinge portion 46 which preferably includes an instrument panel skin layer 54. Substrate 21 includes a plurality of score lines or apertures 47 in a row along the forward section of substrate 21 depicted with forward cut lines 31 defining hinge portion 46. The hinge portion 46 is suitably secured to the remaining substrate 21 during airbag deployment using a fabric-type tether 48 or a separate metal tether could also be provided (shown with phantom lines in FIG. 4). The rearward edge of the minor door portion 27 serves as a hinge portion 50 which is preferably includes instrument panel skin layer 54. Hinge portion 50 is defined by a plurality of score lines or apertures 52 in a row along the rearward section of substrate 21 depicted with rearward cut lines 32. The hinge portion 50 is also suitably secured to the remaining substrate 21 during airbag deployment using the fabric-type tether 48 discussed more fully below. It will be noted that although minor and major substrate door portions 27, 28 have been described as being dissimilar in size, that door portions 27, 28 within corresponding hidden door opening 30 may be of other suitable sizes and shapes relative to each other to form hidden door opening 30. Likewise, it will be recognized that a single door portion may be employed in opening 30 instead of the two door portions illustrated.

Door portions 27, 28 have an inner or bottom surface 41 which faces airbag module 60. Door portions 27, 28 also include an opposite outer or top surface 44 which is flushly aligned and contoured with the surrounding outer substrate surface 21, as shown in FIG. 2. During airbag deployment, the minor and major substrate door portions 27, 28 lift up and break away from the major substrate portion 21 as enabled by the cut lines 31, 32, 33, 34 as described further hereinafter.

Airbag module 60 includes an airbag 61 and an inflator 62 for generating gas to inflate the airbag 61. The airbag 61 and inflator 62 are both preferably stored in a housing 63 which is suitably mounted to an underlying vehicle structure. The airbag 61 and inflator 62 may be of any conventional construction for deployment upon the sensing of predetermined vehicle conditions.

A decorative outer skin layer 54 preferably covers both the foam layer 23 and substrate 21 to provide a smooth and continuous outer panel surface 17 on the instrument panel cover arrangement 20. Preferably, the outer skin layer 54 is formed of any material which is suitable for an outer skin of an instrument panel cover arrangement 20, such as a plastic material including urethane, PVC or TPO. However, it will also be appreciated that other outer decorative coverings, such as skin and foam, could also be utilized. In an exemplary embodiment, outer skin layer 54 is formed of TPO having a thickness of about 1 mm. Score lines are cut on an inside surface to align with the die cut lines defining hidden door opening 30. The score lines are sonic or laser cut to a depth of about 5 mm from the inside surface material.

Figure 3:
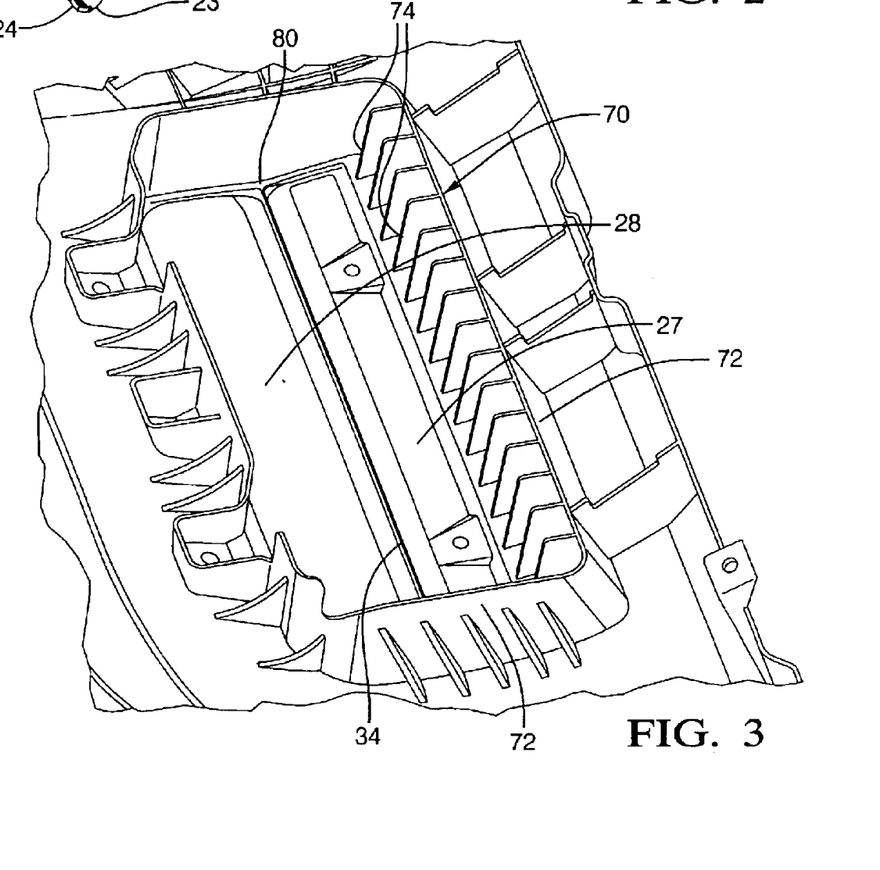
FIG. 3 is an inside perspective view of the instrument panel of FIGS. 1 and 2 illustrating a integrally molded passenger airbag substrate having chute walls and door halves configured in the instrument panel substrate.

The instrument panel substrate 21 is made as follows with reference to FIGS. 3 and 4. Substrate 21 is integrally molded, preferably as a single continuous piece with the door portions 27, 28 integrally molded therein and formed with a chute wall portion 70 during the molding process. Chute wall portion 70 extends from a bottom surface of substrate 21 and extends to operably couple with housing 63. Chute wall portion 70 is optionally configured to shingle around housing 63. Chute wall portion 70 is defined by four chute walls 72 arranged outside a perimeter defining hidden doors 27, 28. A pair of opposing chute walls 72 further includes stiffening ribs 74 substantially parallel spaced to strengthen the lengthier sides defining chute wall portion 70. It will be recognized by one skilled in the pertinent art that chute wall portion 70 may be configured in other suitable shapes other than a rectangular shape depicted in the Figures.

In addition, tether strap receptacles 76 are configured in minor and major substrate door portions 27, 28 to accept one end of tether 48 and are aligned with corresponding receptacles 76 in an outside perimeter portion of substrate 21 to accept an opposite end of a corresponding tether 48. Each receptacle 76 includes an aperture 78 to receive a mechanical fastener (e.g., such as a rivet, not shown) extending through one end of the tether 48 to fix that end of the tether to the receptacle 76. In an exemplary embodiment depicted in the Figures, four small tether straps 48 and eight mechanical fasteners, such as rivets (not shown), are utilized to attach the tethers to substrate 21 outside opening 30 and each of the substrate door portions 27, 28. These straps 48 are configured in a manner that allows them to straighten as the door portions 27, 28 are forced upwards by the inflating airbag 61. As the tethers straighten, the airbag splits the two door portions 27, 28 apart at dividing line 34, both clearing opening 30 by hinging forward and rearward about their respective attached tethers. During and after the deployment event, the door portions 27, 28 remain attached to substrate 21 via the tethers and the rivets.

The outer skin 54 is configured such that it covers and follows the contour of foam layer 23. In this condition in which the substrate 21 is a continuous piece, it would be extremely difficult to provide a deployment opening in the substrate 21 based only on the force of the deploying airbag 61 or to separate the hidden door portions 27, 28 from each other at line 34 and from the relatively strong material of the substrate 21. Thus, the substrate 21 is first molded with a thinned area along cut lines 31, 32, 33 and 34 and then selectively cut therealong to generally define the airbag deployment opening 30 in substrate 21. The thinned portion defining cut lines 31, 32, 33, 34, preferably extends partially through substrate 21 from an inside or bottom surface and divides the substrate 21 into the minor substrate door portion 27 and the major substrate door portion 28. Moreover, the thinned portion corresponding to cut lines 31, 32, 33, and 34 is formed along an entire perimeter defining minor and major substrate door portions 27, 28 forming a first relief 80 in the inside or bottom surface of substrate 21 illustrated in FIG. 3 and better illustrated in cross section in FIG. 8.

Preferably, first relief 80 initially defining cut lines 31, 32, 33, 34 is formed when molding substrate 21 having chute wall portion 70 integrally molded therewith in a controllable manner so as to not create an opening through to the outside or top surface of substrate 21. First relief 80 is molded or thinned to a depth of about 0.8 mm from a top surface of substrate 21 wherein the nominal thickness of substrate 21 is about 2.5 mm and first relief is about 0.8 mm in one embodiment, for example, depicted in FIG. 3 and best seen in FIG. 8.

Figure 4:
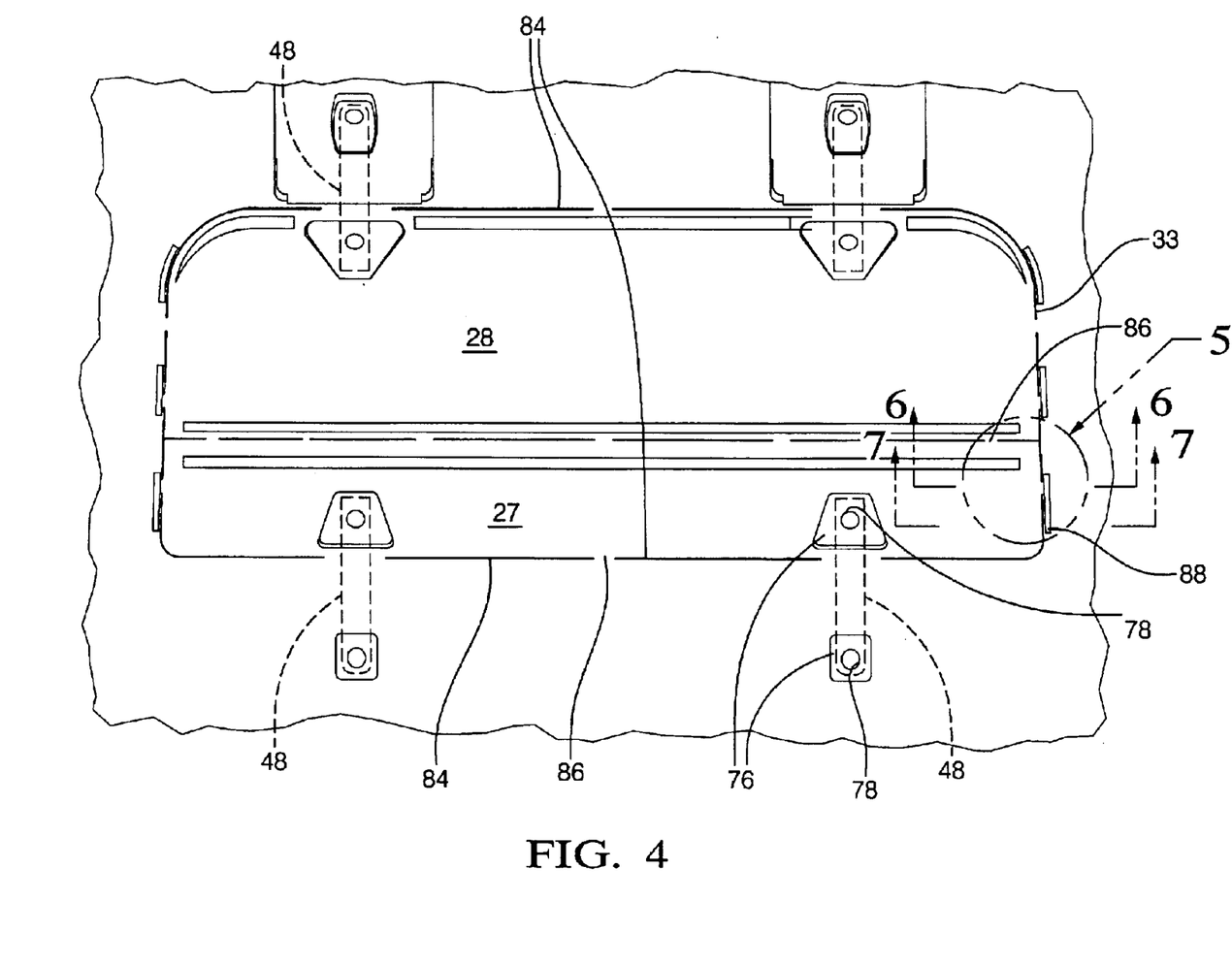
FIG. 4 is an outside plan view of the passenger airbag substrate of FIG. 3 illustrating a first relief defining the door halves of the instrument panel substrate.
Figure 5:
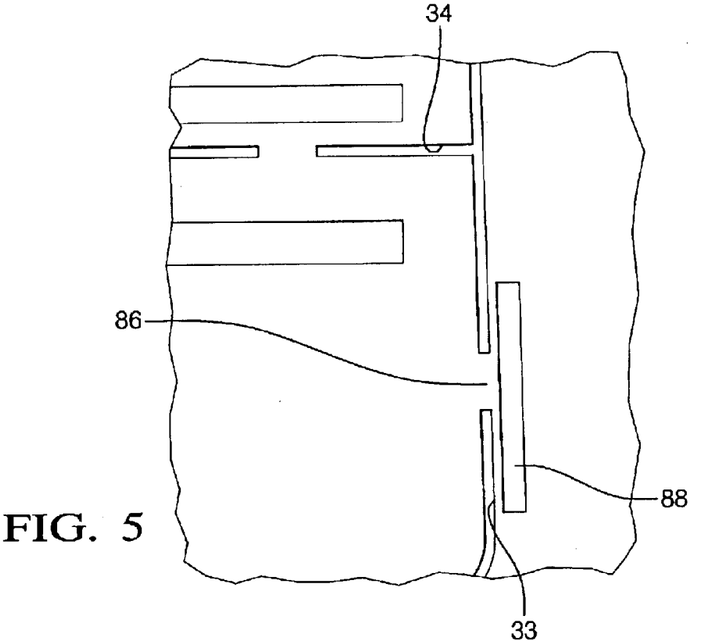
FIG. 5 is an enlarged partial view of FIG. 4 illustrating an exemplary second relief proximate a nubbin aligned with the first relief.

Referring now to FIGS. 4 and 5, a nubbin pattern is then "cut" into the retainer at this thinned out area defining cut lines 31, 32, 33, and 34 shown generally with dashed line 84 in FIG. 4. The nubbin pattern is preferably formed with a hot knife blade, however, other suitable means are contemplated, such as a router, water jet or laser cut. The hot knife extends through the entire thickness defining a thinned area corresponding to first relief 80 wherein the blade is relieved at locations where a nubbin 86 is to remain. As the hot knife blade "cuts" through the thinned retainer material and into the foam layer 23. A witness mark in made on the inside surface of the substrate material (ISM) by a raised feature on the knife blade die block as an error proofing feature and insures that the knife has penetrated substrate 21 and foam layer 23 to a proper depth. This mark can be read by an optics system as a go/no-go type feature. The die block is a mass of metal from which a plurality of knife blades mount to and extend therefrom. The die block also holds cartridge heaters that heat the block and ultimately the knife blades through heat transfer. Th knife blades extend from the block by an amount great enough to allow the heated knife blades to cut to the proper depth without having the die block touch the bottom surface of substrate 21 except for a small portion of the block that generates the witness math to be read by the optics system. The Knife blades are not retracted until the optics system detects a proper witness mark.

The key to leaving a clean edge at the nubbin 86 during a deployment event is to relieve an outside surface of substrate material (OSM) just outside of a perimeter defining the PAB hidden door opening 30 at each of a right and left hand side nubbins 86 defining sides of door portions 27, 28. In other words, a second relief 88 is formed during the molding process in the OSM or top surface of substrate 21 proximate nubbins 86 corresponding with cut lines 33 defining side edges of opening 30. The remaining nubbins 86 (i.e., disposed on forward, rearward, and dividing door edges) are protected from affecting the airbag by the nylon fabric material used to keep the airbag folded and in place within the PAB module through the assembly process.

Figure 6:
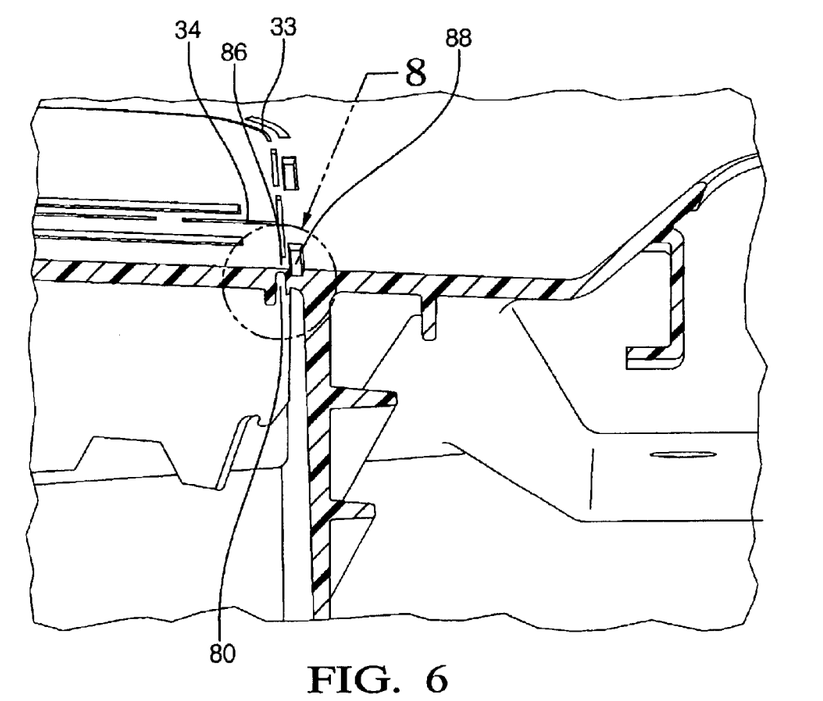
FIG. 6 is a partial cross sectional view of the passenger airbag substrate along the lines 6—6 of FIG. 4 illustrating the first relief having a nubbin aligned therewith in accordance with the present disclosure.
Figure 7:
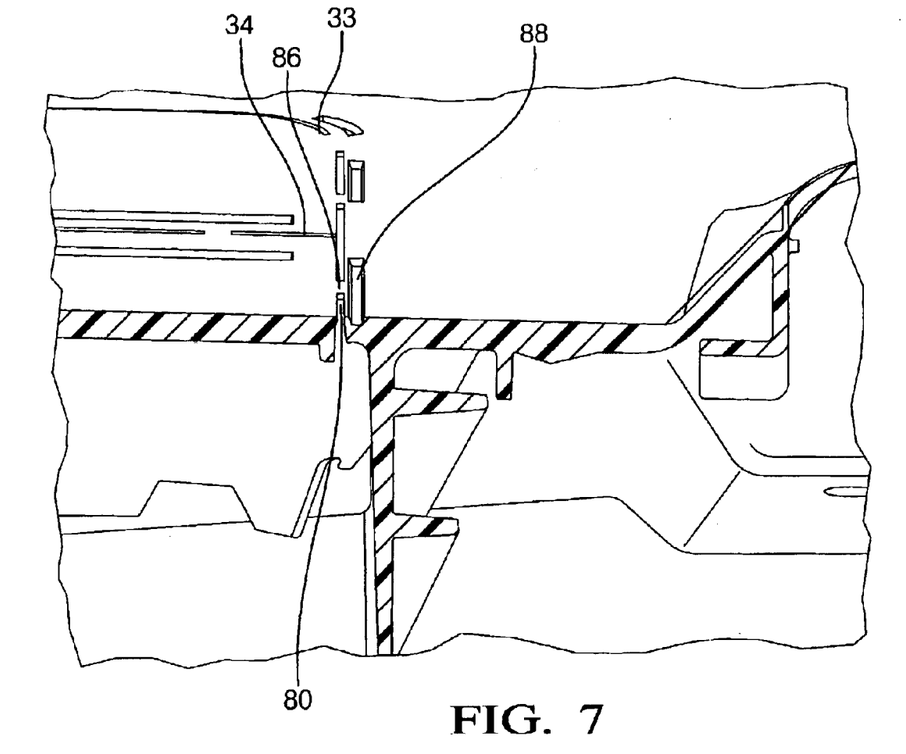
FIG. 7 is a partial cross sectional view of the passenger airbag substrate along the lines 7—7 of FIG. 4 illustrating the first relief without a nubbin aligned therewith in accordance with the present disclosure.
Figure 8:
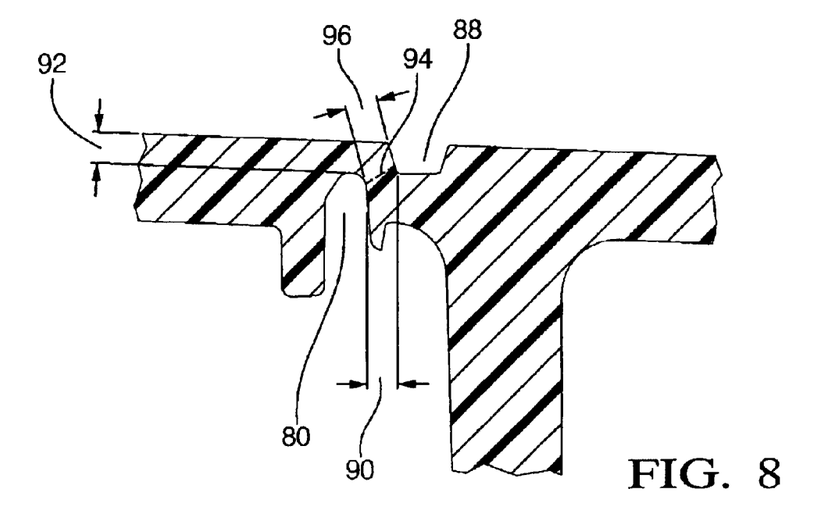
FIG. 8 is an enlarged cross sectional view of FIG. 7 illustrating a nubbin intact before deployment of the passenger airbag.

Referring now to FIGS. 6–8, various perspective cross sectional views are illustrated showing nubbins 86 and second reliefs 88. In an exemplary embodiment, each second relief is located 0.8 mm outboard of the thinned out perimeter area defining first relief 80 as best shown in FIG. 8 generally at 90. This design assures that the maximum amount of remaining nubbin that can be exposed to the airbag is just 0.8 mm in the cross car direction. FIG. 8 also illustrates the thickness of substrate 21 corresponding to first relief as 0.8 mm generally at 92. The design also assures the remaining material does not point inward to the opening 30 which the airbag must past through, thereby preventing the airbag from snagging or tearing on the remaining nubbin material. In fact, the remaining material after the deployment faces up and outward away from the airbag generally shown in phantom generally at 94. Furthermore, once a nubbin 86 breaks after deployment as indicated with phantom line 94, the length of the remaining tapered nubbin is about 0.95 mm as indicated at 96.

Referring now to FIGS. 4, 6, and 7 in combination, FIG. 6 illustrates a perspective cross sectional view along line 6—6 through a nubbin 86 corresponding to first relief 80 in FIG. 4, while FIG. 7 illustrates a perspective cross sectional view along line 7—7 not corresponding to the nubbin 86 depicted in FIG. 4. In other words, FIG. 7 illustrates in cross section an exemplary embodiment of a side of minor substrate door portion 27 where a hot knife has entirely cut through substrate 21 from a bottom surface to a top surface thereof along cut line 33. FIG. 6 illustrates in cross section where a hot knife, for example, has been relieved from cut line 33 corresponding to first relief 80 forming nubbin 86 in effect.

In operation and upon the sensing of predetermined vehicle conditions, the inflator 62 generates inflation gas which fills the airbag 61. The airbag 61 inflates and pushes out against an inner or bottom surface of substrate 21, especially in the area of dividing line 34 between minor and major substrate door portions 27, 28 aligned above the airbag 61. Referring to FIGS. 1–4, the force of the deploying airbag 61 forces the dividing line 34 and outer edges substantially normal to dividing line 34 to lift and break apart separating the major substrate portion 28, as enabled by the cut lines 31, 33, and 34 from minor substrate door portion 27, both separating from substrate 21 into the minor and major substrate door portions 27, 28. Advantageously, the outer edges corresponding to cut lines 33 preferably separate and lift cleanly from the outlining substrate 21 during deployment enabled by second reliefs 88 corresponding to contiguous cut lines 33. The door portions 27, 28 also easily break through the thin outer skin layer 54 as it opens to reveal the deployment opening 30 defined by the cut lines 31, 32, 33. As the airbag 61 deploys, the door portions 27, 28 pivot open about corresponding hinge portions 46 and 54 and the substrate door portions 27, 28 remain attached to substrate 21 via tether straps 48.

It will be appreciated that the instrument panel arrangement 20, including the substrate 21, provides a lightweight and strong instrument panel arrangement 20 which can be easily molded and designed to many aesthetically pleasing shapes. Furthermore, the cut lines 31, 32, 33, 34 are not visible and the instrument panel cover arrangement 20 includes a smooth outer panel surface 17 as enabled by the flush alignment of the hidden door portions 27, 28 and the outer substrate surface 23. Advantageously, the deployment opening 30 cannot be detected prior to airbag deployment to provide an aesthetically pleasing instrument panel cover arrangement 20 capable of customer abuse.

It will be understood that a person skilled in the art may make modifications to the preferred embodiment shown herein within the scope and intent of the claims. Although the panel cover arrangement disclosed in the exemplary embodiments are instrument panel cover arrangements, other vehicle panel cover arrangements are contemplated. For example, the panel cover arrangements may be employed with a steering wheel panel cover arrangement, a roof or door panel cover arrangement as well. As more passive safety restraint systems (e.g., airbags) are added to protect occupants against side impact and rollovers, the above panel cover arrangement may be employed outside of an instrument panel. Therefore, the panel cover arrangement disclosed herein is not to be construed as being limited to instrument panel cover arrangements. Furthermore, although the preferred embodiment shows the instrument panel arrangement 20 preferably being made of a single continuous piece, it is only necessary that the instrument panel arrangement 20 be a single continuous piece in the area of the airbag deployment opening 30 to be utilized.

It will also be understood that a person skilled in the art may make modifications to the preferred emodiment shown herein for example, by reducing the size of each nubbin 86 while still preventing occupant abuse. In doing so, a smaller nubbin remains upon deployment and less initial nubbin material lowers the breakout force needed. A lower breakout force allows for a lower output of the airbag inflator. Once the airbag inflator output is lowered, the size and mass of the PAB door tethers can be reduced. All of these factors have a positive effect in lowering cost, mass and variation in part assembly design.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A panel cover arrangement used for covering an airbag module in a vehicle, comprising:
    a rigid substrate having inner and outer surfaces, said substrate having a hidden door formed therein, said hidden door being aligned with the airbag module disposed proximate to said inner surface of said substrate, said hidden door being defined by a first thinned portion of said substrate outlining a perimeter of said hidden door, said first thinned portion being formed by a first relief extending into said inner surface of said substrate, said substrate having a first plurality of cut lines extending entirely through said first thinned portion spaced apart from one another along at least a portion of the first thinned portion, the first thinned portion having a plurality of support regions wherein each support region is disposed between adjacent cut lines of the first plurality of cut lines, said first plurality of cut lines generally defining an airbag deployment opening, said substrate having a second plurality of thinned portions outside of a periphery of said first thinned portion wherein at least one thinned portion of the second plurality of thinned portions is disposed proximate one of the support regions, said second plurality of thinned portions being formed by a second plurality of reliefs extending into said outer surface; and
    a chute wall portion extending from said inner surface of said substrate outside of said perimeter of said hidden door.

2. The panel cover arrangement of claim 1 wherein first and second portions of said second plurality of thinned portions are disposed proximate first and second sides, respectively, of said hidden door.

3. The panel cover arrangement of claim 2 wherein said first and second sides of said hidden door are generally parallel and proximate to first and second transverse sides, respectively, of the vehicle.

4. The panel cover arrangement of claim 1 wherein said hidden door is further defined by a dividing line configured therein to form two hidden doors, said dividing line formed from a third thinned portion of said substrate extending across said hidden door.

5. The panel cover arrangement of claim 4 wherein a second plurality of cut lines extend entirely through the third thinned portion along at least a portion of the third thinned portion.

6. The panel cover arrangement of claim 1 further comprising a means for securing at least one edge of said hidden door to said substrate during deployment of the airbag through said opening.

7. The panel cover arrangement of claim 6 wherein said means includes a plurality of tethers configured to be operably attached at one end to said hidden door and another end to said substrate outside of said opening.

8. The panel cover arrangement of claim 1 wherein said first plurality of cut lines are formed using at least one of a hot knife, a laser, a router, and a water jet.

9. The panel cover arrangement of claim 1 wherein each relief of said second plurality of reliefs is spaced outward from an edge defining said first plurality of cut lines by about 0.8 mm.

10. The panel cover arrangement of claim 1 wherein at least one support region of the plurality of support regions tapers toward a thinned portion of the second plurality of thinned portions and said outer surface of said substrate when said airbag deploys breaking said at least one support region, said taper on said at least one support region configured to limit tearing and snagging of said airbag during deployment thereof through said opening.

11. The panel cover arrangement of claim 1 wherein said chute wall portion further comprises a plurality of stiffening ribs.

12. The panel cover arrangement of claim 1 wherein said chute wall portion and said substrate are molded using PC+ABS.

13. The panel cover arrangement of claim 1 whereby upon airbag deployment, the airbag pushes on said inner surface of said substrate and forces at least one support region of the plurality of support regions in a direction normal to said outer surface to induce said support region to break apart to allow said hidden door to pivot open about a means for securing said hidden door to said substrate.

14. A method of making a panel cover arrangement for overlying an airbag module and providing an airbag deployment opening, the method comprising:

integrally molding a rigid substrate having inner and outer surfaces, said substrate having a hidden door formed therein, said hidden door being defined by a first thinned portion of said substrate outlining an entire perimeter of said hidden door, said first thinned portion being formed by a first relief extending into said inner surface of said substrate, and a chute wall portion extending from said inner surface of said substrate outside of a perimeter defining said first thinned portion;

cutting a first plurality of cut lines extending entirely through said first thinned portion wherein each cut line of the first plurality of cut lines is spaced apart from one another along at least a portion of the first thinned portion, said first thinned portion having a plurality of support regions wherein each support region is disposed between adjacent cut lines of the first plurality of cut lines, said first plurality of cut lines generally defining the airbag deployment opening, and forming a second plurality of thinned portions outside of a periphery of said first thinned portion and inside a periphery of said chute wall portion, said second plurality of thinned portions being formed by a second plurality of reliefs extending into said outer surface wherein each thinned portion of the second plurality of thinned portions is disposed proximate one of the support regions.

15. The method of claim 14 wherein first and second portions of said second plurality of thinned portions are disposed proximate first and second sides, respectively, of said hidden door.

16. The method of claim 15 wherein said first and second sides of said hidden door are generally parallel and proximate to first and second transverse sides, respectively, of the vehicle.

17. The method of claim 14 wherein said hidden door is further defined by a dividing line configured therein to form two hidden doors, said dividing line formed from a third thinned portion of said substrate extending across the hidden door.

18. The method of claim 17 wherein a second plurality of cut lines extend entirely through the third thinned portion along at least a portion of the third thinned portion.

19. The method of claim 14 wherein said first plurality of cut lines are formed using at least one of a hot knife, a laser, a router, and a water jet.

20. The method of claim 14 wherein each relief of said second plurality of reliefs is spaced outward from an edge defining said first plurality of cut lines by about 0.8 mm.

21. The method of claim 14 wherein at least one support region of the plurality of support regions tapers toward a thinned portion of the second plurality of thinned portions and said outer surface of said substrate when said airbag deploys breaking said at least one support region, said taper on said at least one support region configured to limit tearing and snagging of said airbag during deployment thereof through said opening.

22. The method of claim 14 wherein said chute wall portion has a plurality of stiffening ribs.

23. The method of claim 14 whereby upon airbag deployment, the airbag pushes on said inner surface of said substrate and forces at least one support region of the plurality of support region in a direction normal to said outer surface to induce said support region to break apart to allow said hidden door to pivot open about a means for securing said hidden door to said substrate.

24. A support member for use in an instrument panel of a vehicle, comprising:

a substrate layer having first and second sides and a cut pattern defining a periphery of an opening region,
the cut pattern comprising a first plurality of cut regions extending through the substrate layer and a first plurality of uncut regions, the first plurality of cut regions extending around a substantial portion of the cut pattern, each uncut region of the first plurality of uncut regions being disposed between two cut regions of the first plurality of cut regions, said cut pattern further comprising a second plurality of cut regions extending through the substrate layer and a second plurality of uncut regions, the second plurality of cut regions and the second plurality of uncut regions being disposed across the opening region, each uncut region of the second plurality of uncut regions being disposed between two cut regions of the second plurality of cut regions the cut pattern being cut into the substrate layer after the substrate layer has been molded into a predetermined shape.

25. The support member of claim 24, wherein the second plurality of uncut regions are configured to at least partially separate from the substrate layer in response to a deployment force being applied to the substrate layer.

26. The support member of claim 24, wherein each uncut region of the first plurality of uncut regions has a width substantially equal to 0.95 mm.

27. The support member of claim 24, wherein the substrate has a plurality of thinned portions on a first side of the substrate and outside of a periphery of the cut pattern wherein at least one thinned portion of the plurality of thinned portions is disposed proximate one of the uncut regions of the first plurality of uncut regions.

28. An instrument panel of a vehicle, comprising:
a substrate layer having a first side and a second side and a cut pattern defining a periphery of an opening region, the cut pattern comprising a first plurality of cut regions extending through the substrate layer and a first plurality of uncut regions, the first plurality of cut regions extending around a substantial portion of the cut pattern, each uncut region of the first plurality of uncut regions being disposed between two cut regions of the first plurality of cut regions, said cut pattern further comprising a second plurality of cut regions extending through the substrate layer and a second plurality of uncut regions, the second plurality of cut regions and the second plurality of uncut regions being disposed across the opening region, each uncut region of the second plurality of uncut regions being disposed between two cut regions of the second plurality of cut regions;
a cover layer having an outer surface and an inner surface; and
a foam layer disposed between the inner surface of the cover layer and the second side of the substrate layer, wherein the cut pattern is cut into the substrate layer after the substrate layer, the foam layer, and the cover layer have been coupled together.

29. The instrument panel of claim 28, wherein the second plurality of uncut regions are configured to at least partially separate from the substrate layer in response to a deployment force being applied to the substrate layer.

30. The instrument panel of claim 28, wherein each uncut region of the first plurality of uncut regions has a width substantially equal to 0.95 mm.

31. The instrument panel of claim 28, wherein a hot knife cuts both the first plurality of cut regions extending through the substrate layer and portions of the foam proximate the first plurality of cut regions.

32. The support member of claim 28, wherein the substrate has a plurality of thinned portions on a second side of the substrate and outside of a periphery of the cut pattern wherein at least one thinned portion of the plurality of thinned portions is disposed proximate one of the uncut regions of the first plurality of uncut regions.

33. A method for manufacturing a support member for use in an instrument panel of a vehicle, comprising:
forming a substrate layer into a predetermined shape; and
cutting a predetermined cut pattern into the substrate layer, the predetermined cut pattern defining a periphery of an opening region in the substrate layer, the predetermined cut pattern comprising a first plurality of cut regions extending through the substrate layer and a first plurality of uncut regions, the first plurality of cut regions extending around a substantial portion of the predetermined cut pattern, each uncut region of the first plurality of uncut regions being disposed between two cut regions of the first plurality of cut regions, and
cutting a second plurality of cut regions into the substrate layer, the second plurality of cut regions extending through the substrate layer and define a second plurality of uncut regions, the second plurality of cut regions and the second plurality of uncut regions being disposed across the opening region, each uncut region of the second plurality of uncut regions being disposed between two cut regions of the second plurality of cut regions.

34. The method of claim 33, wherein the step of forming the substrate layer into a predetermined shape comprises forming a plurality of thinned portions on a first side of the substrate and outside of a periphery of the cut pattern wherein at least one thinned portion of the plurality of thinned portions is disposed proximate one of the uncut regions of the first plurality of uncut regions.

35. A method for manufacturing an instrument panel of a vehicle, comprising:
forming a substrate layer into a first predetermined shape;
forming a cover layer into a second predetermined shape;
disposing a foam layer between the substrate layer and the cover layer; and
cutting a predetermined cut pattern into the substrate layer after disposing the foam between the substrate layer and the cover layer, the predetermined cut pattern defining a periphery of an opening region in the substrate layer, said cutting the predetermined cut pattern comprising
cutting a first plurality of cut regions extending through the substrate layer and a first plurality of uncut regions, the first plurality of cut regions extending around a substantial portion of the predetermined cut pattern, each uncut region of the first plurality of uncut regions being disposed between two cut regions of the first plurality of cut regions, and
cutting a second plurality of cut regions into the substrate layer, the second plurality of cut regions extending through the substrate layer and define a second plurality of uncut regions, the second plurality of cut regions and the second plurality of uncut regions being disposed across the opening region, each uncut region of the second plurality of uncut regions being disposed between two cut regions of the second plurality of cut regions.

36. The method of claim 35, wherein the first plurality of cut regions extend through the substrate layer and through at least a portion of the foam layer.

37. The method of claim 35, wherein the forming step comprises forming a plurality of thinned portions on a first side of the substrate and outside of a periphery of the cut pattern wherein at least one thinned portion of the plurality of thinned portions is disposed proximate one of the uncut regions of the first plurality of uncut regions.

* * * * *